Figure 1:
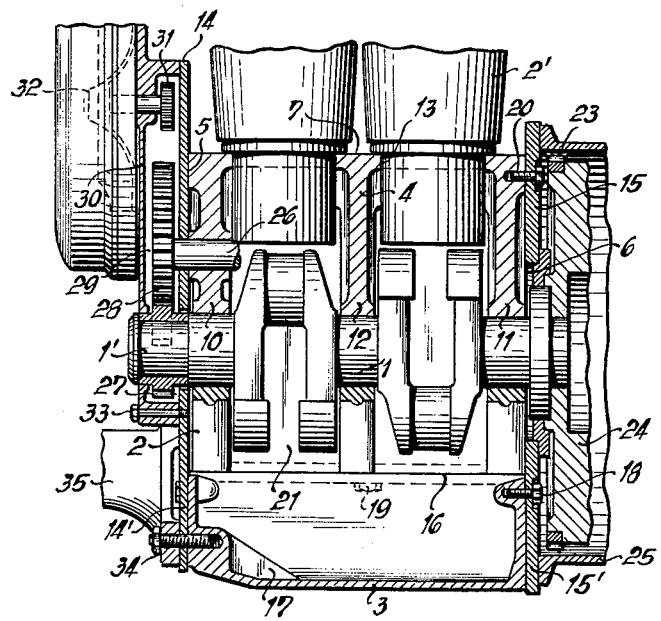

Oct. 30, 1962 — H. HOENICK — 3,060,902

INTERNAL COMBUSTION ENGINE

Filed May 23, 1960

INVENTOR
Hans HÖNICK

BY Dicke, Craig & Freudenberg
ATTORNEYS

United States Patent Office 3,060,902
Patented Oct. 30, 1962

3,060,902
INTERNAL COMBUSTION ENGINE
Hans Hoenick, Stuttgart-Zuffenhausen, Germany, assignor to Firma Dr. Ing. h.c. F. Porsche K.G., Stuttgart-Zuffenhausen, Germany
Filed May 23, 1960, Ser. No. 31,130
Claims priority, application Germany June 6, 1959
4 Claims. (Cl. 121—194)

The present invention relates to an internal combustion engine, especially for the drive of tractors provided with an engine housing core containing the crankshaft which is open in the direction toward the oil pan and which supports or carries the working cylinders of the engine.

With the known prior art constructions of this type, the crankcase supporting the cylinders is constructed so as to be inherently torsion-rigid and is closed off toward the outside thereof by means of shell members carrying or covering the auxiliary aggregates and units necessary for the operation of the engine. As a result of such a construction, numerous flanges and the like are required at the housing so that the housing, especially in case when laterally arranged securing places extending at an angle with respect to the cylinder axis are present, can be machined only with time-consuming and costly operations increasing the overall cost of the engine. Additionally, such prior art types of housings are relatively heavy and require complicated casting molds.

These disadvantages encountered in the prior art devices are eliminated effectively in accordance with the present invention by the use of a cast housing core absorbing essentially only the static loads thereof which is completed into a hollow body resistant against torsional forces and stresses by the oil pan and the end parts arranged at the front and rear end of the housing. Such an arrangement not only results in a simple casting form but also entails the advantage that only plane-parallel surfaces have to be machined at the housing which entails, especially with mass produced engines, a significant simplification of the machining operation thereof. This may be traced back essentially to the fact that the machining of places at the side walls of the housing which are relatively inaccessible or accessible only with difficulty is obviated by the provision of the end parts in accordance with the present invention. Furthermore, the housing is lighter and exhibits nevertheless a relatively high torsion-resistance after assembly thereof which permits to include the engine block as a supporting component part into the drive unit of the tractor.

The housing construction in accordance with the present invention is preferably selected in such a manner that the end parts extend beyond the housing core and the oil pan is pressed in between the housing core and the end parts. A compact housing of block-type construction results therefrom with the significant advantage that the same end parts may also be used for the housing cores of a manufacture line with several cylinders, for example, of differing numbers. The end parts extend parallel to the end faces of the housing core and are detachably connected therewith. The end parts are to be assembled thereby and assure a safe sealing of the crankcase. The oil pan essentially consists of a reinforced casting which is detachably connected with the end parts and the housing core. The oil pan is thereby included in the housing as a supporting component part, yet may be readily disassembled therefrom. The end parts are preferably formed by flange plates which carry or support thereon a part of the auxiliary aggregates or apparatus necessary for operation of the engine. Since the flanged plate may be machined more readily than the housing core, a further cost saving simplification results from such an arrangement. The flanged plate at the front end is traversed by the shafts of the drive for the control and auxiliary aggregates which, in turn, with the respective gears thereof are covered by a lid or cover secured to the flanged end plate. By the use of such an arrangement not only a simple assembly of the flange-plates is assured but also there exists the possibility of readily installing the driven gear set driven from the crankshaft with a closed crankcase. The flange-plate at the front end is further provided within a region above and below the separating joint between the housing core and the oil pan with support means for accommodating the front axle support of the driven vehicle whereby the same are useful for several purposes.

Accordingly, it is an object of the present invention to provide an internal combustion engine construction which avoids the inconveniences and disadvantages encountered in the prior art constructions.

It is another object of the present invention to provide an internal combustion engine block construction in which the housing core may be made of relatively light weight construction and which offers nevertheless a high degree of rigidity by reason of the particular assembly thereto of various specially constructed component parts.

Still another object of the present invention is the provision of an internal combustion engine assembly in which the housing core, the oil pan and the front end and rear end walls are so combined and secured to each other as to form a unit relatively highly resistant to torsional forces and stresses notwithstanding the absence of such resistance of the individual core member.

A still further object of the present invention resides in the provision of an internal combustion engine in which the various housing parts may be machined without excessive costs resulting in time-saving as well as cost-saving manufacture and assembly thereof.

Still another object of the present invention is the provision of an engine housing for an internal combustion engine in which most if not all of the surfaces to be machined are of plane-parallel configuration to thereby simplify the sundry involved machining operations.

A still further object of the present invention resides in the provision of a composite crankcase in which specially designed flange-plates used at the front and rear end thereof may be used for different types of an entire series of engines having a different number of cylinders.

A still further object of the present invention resides in the provision of an internal combustion engine provided with a crankcase which is rigid, lightweight and in which the various parts are so assembled as to reinforce one another.

Figure 2:
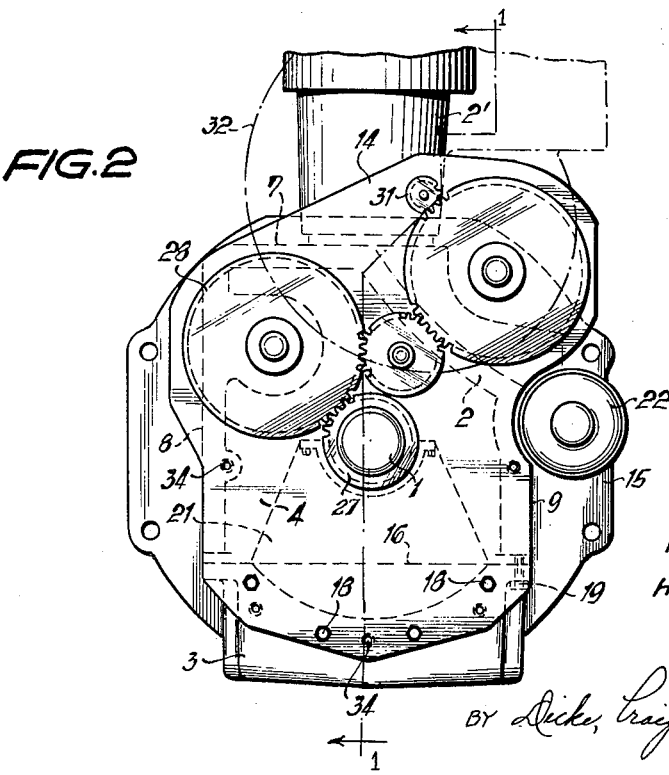

These and other objects, features and advantages of the present invention will become more obvious from the following description when taken in connection with the accompanying drawing, which shows, for purposes of illustration only, one embodiment in accordance with the present invention and wherein FIGURE 1 is a longitudinal cross-sectional view through the crankcase of an air-cooled internal combustion engine having a housing construction in accordance with the present invention, this view being taken on the planes of line 1—1, FIGURE 2, and FIGURE 2 is an end elevational view of the front end of the engine with the housing cover taken off whereby the cooling blower of the engine is indicated in dot and dash line.

Referring now to the drawing wherein like reference numerals are used to designate corresponding parts in the two figures thereof, reference numeral 1 designates therein the crank assembly of a multi-cylinder internal combustion engine which is supported in a crankcase 2. The crankcase 2 thereby carries or supports the individual working cylinders 2'. The crankcase 2 essentially consists of a U-shaped housing core 4 open in the direction toward the oil pan 3 and having a front end face 5, a rear end face 6, a top side 7 as well as two lateral sides 8 and 9 (FIGURE 2), these two sides constituting the legs of the U which are connected by the top side 7, constituting the cross piece of the U. In this cross piece bores are provided for the reception of the cylinders 2' as shown in FIGURE 1. The front end 5 and the rear end 6 contain the bearing places 10 and 11 for the crank assembly 1. A center web 12 provided at the housing core 4 serves simultaneously as bearing place for the crankshaft 1'. The top side 7 of the housing core 4 is provided with apertures 13 for receiving therein the working cylinders 2'. A flange-plate 14 is arranged at the front end face 5 which extends parallelly thereto and a relatively heavier flange-plate 15 is arranged at the rear end face 6 which also extends essentially parallelly thereto. The flange-plates 14 and 15 extend beyond the top side 7 and beyond the separating joint 16 between the housing core 4 and the oil pan 3. The oil pan 3 is pressed in between the projecting ends 14' and 15' of the flange plates 14 and 15 which extend downwardly beyond the housing core 4. The oil pan 3 consisting of a cast part having upwardly extending end faces abutting plates 14 and 15 is reinforced by means of several cooling ribs 17 and is connected by means of several bolt members 18 (FIGURES 1 and 2) distributed along the rims thereof with the flange-plates 14 and 15 at levels below the separating joint 16 and by means of several bolt members 19 (FIGURE 2) with the housing core 4.

Prior to assembly of the flange-plates 14 and 15 which is undertaken by means of bolt members 20 and prior to the assembly of the oil pan 3, the housing core 4 possesses a rigidity sufficient only for absorbing the local loads and stresses, and is completed into a hollow body 21 (FIGURE 1) rigid against torsional stresses only by fastening thereto the aforementioned parts. The end faces 5 and 6, the top side 7 and the separating joint 16 of the housing core 4 may be readily machined in one machining operation each as a result of such a construction of the crankcase 2. A machining of the lateral walls 8 and 9 of the crankcase 2 is far-reachingly avoided since the essential auxiliary aggregates and apparatus are arranged at the flange-plates 14 and 15.

The flange-plate 15 is constructed for that purpose wider than the housing core 4 (FIGURE 2) and carries the starter 22 (FIGURE 2) which cooperates or meshes with the toothed rim 23 of the flywheel 24 of the engine. The flywheel 24 is thereby accommodated within a housing 25 located ahead of the flange-plate 15 which housing 25 contains the conventional clutch and change-speed-gear for the vehicle drive (not illustrated herein). The housing 25 is flangedly connected at the plate 15.

The front end flange plate 14 is traversed by the crankshaft 1' and the cam shaft 26 (FIGURE 1) which together with the respective gears 27 and 28 forming part thereof effect the control drive and the drive for the auxiliary aggregates of the engine. The gear sets 27 and 28 rotate within a space 29 (FIGURE 1) which is defined by the plate 14 and the cover 30. The cover 30 also contains the drive 31 for the cooling blower 32 of the engine and is flangedly connected at the plate 14 by means of bolt members 33. Securing means 34 are arranged at the plate 14 in the lower part 14' of the flange plate 14 above and below the separating joint 16 at the flange plate 14 which extend into the oil pan 3 and/or into the housing 4. The support means 34 serve for purposes of accommodating a bracket 35 at which the front axle or front suspension of the vehicle of any suitable construction (not shown) is swingingly suspended.

The present invention is not limited to any particular type of engine and is also suitable for industrial, boat or airplane engines. An internal combustion engine provided for the drive of a vehicle can be readily converted in a simple manner into a stationary engine by removing the flywheel which may be readily done since the rear flange-plate does not stand impedingly in the way of such an operation and by interchanging the vehicle flywheel for a correspondingly larger flywheel. Possibly also the drive of a generator or the like for stationary machines, eventually envisaged may be realized subsequently in a simple manner since the flange-plates 14 and 15 may be readily exchanged for flange plates correspondingly constructed in a different manner to conform to the particular requirements.

Thus, while I have shown and described one embodiment in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. An internal combustion engine having a crankcase consisting of a rigid housing core, means in said housing core for supporting the cylinder means of said engine, means in said housing core for supporting the crankshaft of said engine, said rigid housing core being constituted by a U-shaped casting and further comprising a front end depending wall portion and a rear end depending wall portion, said means in said housing core for supporting said crankshaft comprising bearing means in said depending wall portions, means including said housing core for forming a hollow body rigid against torsional forces and stresses, said last-named means further including a rigid oil pan consisting of a casting, said housing core being open in the direction of said rigid oil pan, detachable means securing said rigid oil pan to said core, the lower portion of said core including the lower extremities of said depending wall portions and the upper portion of said rigid oil pan forming a separating joint at a level spaced below said bearing means in said depending wall portions, end plates abutting said depending wall portions, said end plates further abutting opposite ends of said rigid oil pan, and detachable means for securing said plates to said core and to said oil pan and for securing said oil pan to said core.

2. An internal combustion engine according to claim 1, wherein said means in said housing core for supporting the cylinder means of said engine comprises a substantially horizontally extending portion having a top side having apertures therein for receiving said cylinder means, said end plates extending upwardly beyond said top side and downwardly beyond said separating joint.

3. An internal combustion engine according to claim 2, wherein said front end depending wall portion and said rear end depending wall portion are integral with front and rear ends of said substantially horizontally extending portion.

4. An internal combustion engine according to claim 1, wherein said means in said housing core for supporting said crankshaft further comprises a web member having bearing means therein for receiving said crankshaft, said web member terminating at said separating joint.

References Cited in the file of this patent

UNITED STATES PATENTS

| 1,276,389 | Mason et al. | Aug. 20, 1918 |
| 1,979,075 | Meyer | Oct. 30, 1934 |
| 2,208,750 | De Long | July 23, 1940 |
| 2,713,852 | Trout | July 26, 1955 |

FOREIGN PATENTS

| 342,763 | Great Britain | Feb. 9, 1931 |